(12) United States Patent
Kim et al.

(10) Patent No.: US 11,975,608 B2
(45) Date of Patent: May 7, 2024

(54) APPARATUS FOR DISPLAYING DISPLAY INFORMATION ACCORDING TO DRIVING ENVIRONMENT AND METHOD THEREOF

(71) Applicant: HYUNDAI MOBIS Co., Ltd., Seoul (KR)

(72) Inventors: Tae Hun Kim, Yongin-si (KR); Sung Joon Ahn, Seoul (KR); Myung Bin Choi, Seoul (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 297 days.

(21) Appl. No.: 17/367,859

(22) Filed: Jul. 6, 2021

(65) Prior Publication Data

US 2022/0005356 A1    Jan. 6, 2022

(30) Foreign Application Priority Data

Jul. 6, 2020   (KR) .................. 10-2020-0083096
Jul. 17, 2020  (KR) .................. 10-2020-0089064

(51) Int. Cl.
| | | |
|---|---|---|
| G06T 7/20 | (2017.01) | |
| B60K 35/00 | (2006.01) | |
| B60Q 1/50 | (2006.01) | |
| B60Q 9/00 | (2006.01) | |
| G06F 3/147 | (2006.01) | |
| G06V 20/58 | (2022.01) | |

(Continued)

(52) U.S. Cl.
CPC ............ *B60K 35/00* (2013.01); *B60Q 1/5035* (2022.05); *B60Q 1/5037* (2022.05); *B60Q 1/507* (2022.05); *B60Q 1/543* (2022.05); *B60Q 1/547* (2022.05); *B60Q 1/549* (2022.05); *B60Q 9/008* (2013.01); *G06F 3/147* (2013.01); *G06T 7/20* (2013.01); *G06V 20/58* (2022.01); *G08G 1/166* (2013.01); *B60K 35/81* (2024.01); *G06T 2207/30261* (2013.01)

(58) Field of Classification Search
CPC ............ G09G 2380/10; G09F 21/0485; G09F 21/049; G09F 9/372; G06T 7/20; G06T 2207/30261; G06F 3/147; G06F 3/1423; B60K 35/00; G06V 20/58
See application file for complete search history.

(56) References Cited

U.S. PATENT DOCUMENTS

| | | | | |
|---|---|---|---|---|
| 2012/0224060 A1* | 9/2012 | Gurevich | ............... | G06V 20/58 |
| | | | | 348/148 |
| 2016/0082840 A1* | 3/2016 | Yoshida | ................. | B60Q 9/008 |
| | | | | 701/36 |

(Continued)

*Primary Examiner* — Hau H Nguyen
(74) *Attorney, Agent, or Firm* — NSIP Law

(57) ABSTRACT

The present invention relates to an apparatus for displaying display information according to a driving environment and a method thereof. The apparatus for displaying display information according to the driving environment according to the present invention includes an input unit receiving driving environment information, a memory in which a program for controlling internal and external displays of a vehicle according to a driving environment is stored, and a processor executing the program, wherein the processor controls to select and project display information according to the driving environment information in an internal screen area and an external screen area according to preset partitioning.

16 Claims, 17 Drawing Sheets

(51) Int. Cl.
*G08G 1/16* (2006.01)
*B60K 35/81* (2024.01)

(56) References Cited

U.S. PATENT DOCUMENTS

2016/0216521 A1* 7/2016 Yachida .................... B60R 1/00
2018/0264940 A1* 9/2018 Torii .................... B60Q 1/5035
2018/0264944 A1* 9/2018 Torii .................. G02B 27/0101

* cited by examiner

FIG. 6
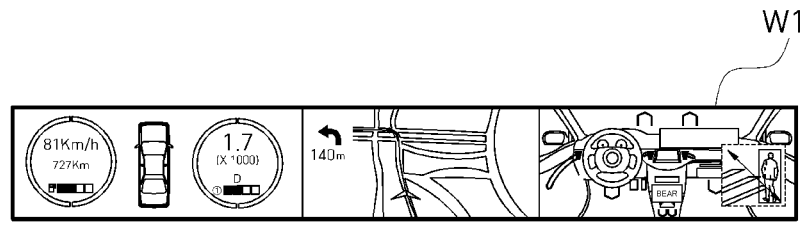
INTERNAL SCREEN
OR
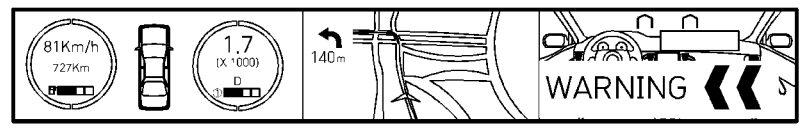
EXTERNAL SCREEN
(VIEWPOINT INSIDE VEHICLE)
EXTERNAL SCREEN
(VIEWPOINT OUTSIDE VEHICLE)

EXTERNAL DISPLAY INFORMATION WITH
TEXT FORM SEEN FROM PEDESTRIAN'S VIEWPOINT

EXTERNAL DISPLAY INFORMATION
WITH TEXT FORM SEEN FROM DRIVER'S VIEWPOINT

INTERNAL DISPLAY INFORMATION
WITH TEXT FORM SEEN FROM DRIVER'S VIEWPOINT

APPARATUS FOR DISPLAYING DISPLAY INFORMATION ACCORDING TO DRIVING ENVIRONMENT AND METHOD THEREOF

CROSS-REFERENCE TO RELATED APPLICATION

This application claims priority to and the benefit of Korean Patent Application Nos. 10-2020-0083096 and 10-2020-0089064, filed on Jul. 6, 2020 and Jul. 17, 2020, respectively, the disclosure of which is incorporated herein by reference in its entirety.

BACKGROUND

1. Field of the Invention

The present invention relates to an apparatus for displaying display information according to a driving environment and a method thereof.

2. Discussion of Related Art

A pedestrian recognizes a surrounding vehicle with the naked eye or through engine noise generated when the vehicle is running.

In case of an electric vehicle, since there is no engine driving noise, a device (virtual engine sound system (VESS)) that forcibly generates noise outside the vehicle is applied to notify the approach of the vehicle.

As a measure to prevent a collision between the vehicle and the pedestrian, it is common to notify that the vehicle is approaching through a horn, but there is a problem that the pedestrian is surprised by honking of the horn, and thus a more efficient safe driving support measure is required.

SUMMARY OF THE INVENTION

The present invention is designed to solve the above-described problems, and the present invention is directed to providing an apparatus and method for displaying display information capable of improving driving safety by controlling/managing display information provided to passengers inside a vehicle and display information provided to pedestrians outside the vehicle according to a driving environment, so that a driver easily recognizes the presence of pedestrians and obstacles so as to avoid a collision and external pedestrians intuitively recognize the driving behavior of the vehicle so as to avoid a collision (e.g., when a vehicle provides an indication that "it is okay to cross" through a display to a pedestrian crossing at a crosswalk without traffic lights, pedestrians can recognize it and cross with confidence) by providing information suitable for each driving situation in an area where it is easy to check a forward visual field.

An apparatus for displaying display information according to a driving environment according to the present invention includes an input unit receiving driving environment information, a memory in which a program for controlling internal and external displays of a vehicle according to the driving environment is stored, and a processor executing the program, wherein the processor controls to select and project display information according to the driving environment information in an internal screen area and an external screen area according to preset partitioning.

The processor may calculate a caution level using the driving environment information, and extract information to be displayed in the internal screen area and the external screen area in consideration of the possibility of collision with an external object according to the caution level.

The processor may control to display driving status information in the internal screen area and a notification message in the external screen area in consideration of the caution level.

The processor may invert a text message displayed in the external screen area left to right and display the text message in a part of the internal screen area.

The processor may equally display an image of vehicle traveling direction information in the internal screen area and the external screen area.

The processor may display an external object image in the internal screen area, and display at least one of approach direction information, approach speed information, and distance information of the external object in the internal screen area.

The processor may expand an area of the external object image displayed in the internal screen area, and display a guidance message for the external object in the external screen area as the caution level is increased.

The processor may display the external object image over the entire internal screen area, and overlay and display a warning phrase as the caution level is increased.

A method of displaying display information according to a driving environment according to the present invention includes (a) recognizing the driving environment, (b) controlling display of internal/external screens of a vehicle based on a recognition result of the driving environment, and (c) controlling display of the internal/external screens of the vehicle according to a change of a caution level.

The operation (a) may include calculating the caution level using a driving speed, map data, and external object recognition information.

The operation (b) may include extracting information to be displayed in an internal screen area and an external screen area according to the caution level, and controlling so as to display driving status information in the internal screen area and display a notification message in the external screen area.

The operation (b) may include inverting a text message displayed in the external screen area left to right and displaying the text message in a part of the internal screen area.

The operation (b) may include equally displaying an image of vehicle traveling direction information in the internal screen area and the external screen area.

The operation (b) may include displaying an external object image in the internal screen area, and displaying at least one of approach direction information, approach speed information, and distance information of the external object in the internal screen area.

The operation (c) may include expanding an area of the external object image displayed in the internal screen area, and displaying a guidance message for the external object in the external screen area as the caution level is increased.

The operation (c) may include displaying the external object image over the entire internal screen area, and overlaying and displaying a warning phrase as the caution level is further increased.

The above-described configurations and operations of the present invention will become more apparent from embodiments described in detail below with reference to the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 6 illustrates display information of the internal screen area and the external screen area at the time of caution level 2 (deceleration, low-speed driving) according to an exemplary embodiment of the present invention;

DETAILED DESCRIPTION OF EXEMPLARY EMBODIMENTS

Advantages and features of the present invention and methods for achieving them will be made clear from embodiments described in detail below with reference to the accompanying drawings.

However, the present invention may be embodied in many different forms and should not be construed as being limited to embodiments set forth herein. Rather, these embodiments are provided so that this disclosure will be thorough and complete and will fully convey the scope of the present invention to those of ordinary skill in the technical field to which the present invention pertains, and the present invention is defined by the claims.

Meanwhile, terms used herein are for the purpose of describing embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Figure 1:
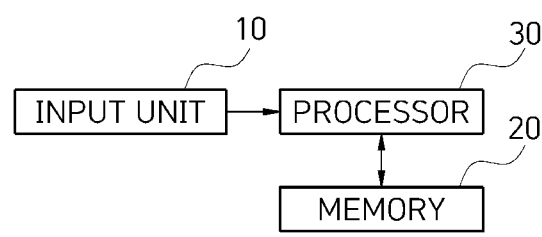
FIG. 1 illustrates an apparatus for displaying display information according to a driving environment according to an exemplary embodiment of the present invention.

FIG. 1 illustrates an apparatus for displaying display information according to a driving environment according to an exemplary embodiment of the present invention.

The apparatus for displaying the display information according to the driving environment according to the present invention includes an input unit 10 receiving driving environment information, a memory 20 in which a program for controlling internal and external displays of a vehicle according to a driving environment is stored, and a processor 30 executing the program, wherein the processor 30 controls to select and project display information according to the driving environment information in an internal screen area and an external screen area according to preset partitioning.

The processor 30 calculates a caution level using the driving environment information, and extracts information to be displayed in the internal screen area and the external screen area in consideration of the possibility of collision with an external object according to the caution level.

The processor 30 controls to display driving status information in the internal screen area and a notification message in the external screen area in consideration of the caution level.

The processor 30 inverts a text message displayed in the external screen area left to right and displays the text message in a part of the internal screen area.

The processor 30 equally displays an image of vehicle traveling direction information in the internal screen area and the external screen area.

The processor 30 displays an external object image in the internal screen area, and displays at least one of approach direction information, approach speed information, and distance information of the external object in the internal screen area.

The processor 30 expands an area of the external object image displayed in the internal screen area, and displays a guidance message for the external object in the external screen area as the caution level is increased.

The processor 30 displays the external object image over the entire internal screen area, and overlays and displays a warning phrase as the caution level is increased.

Figure 2:
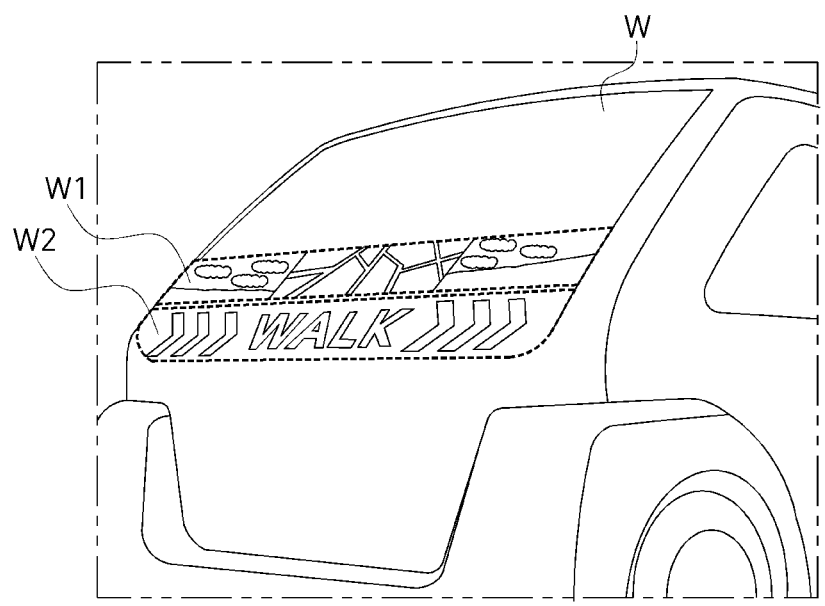
FIG. 2 illustrates an external screen area and an internal screen area of a vehicle windshield according to an exemplary embodiment of the present invention.

FIG. 2 illustrates an external screen area and an internal screen area of a vehicle windshield according to an exemplary embodiment of the present invention.

A vehicle windshield W includes an internal screen area W1 and an external screen area W2.

The internal screen area W1 is a display area for providing information to passengers inside a vehicle, and the external screen area W2 is defined as a display area for providing information to objects outside the vehicle (drivers of other vehicles, pedestrians, etc.).

As described above, the internal screen area W1 is for an indoor display, and is composed of an electrochromic film that does not expose an internal image to the outside in terms of privacy protection and is converted to be transparent as needed so that the driver may check a surrounding environment outside the vehicle.

The internal screen area W1 is maintained in an opaque state as a projector is turned on, and is used for screen expression and display by the projector.

The external screen area W2 is composed of an electrochromic film as described above for external communication, and has a structure capable of external display during projection.

The electrochromic film may be applied (attached) to a partial area or the entire area of the windshield W to be used as a display.

The projector may be installed inside the vehicle, and for example, may be installed on an inner roof side of the vehicle.

The projector may project a projector beam including external display information on the external screen area W2 of the windshield, and may be a short-throw projector when a separation distance to the external screen area is short.

A described above, the external display information displayed by the external screen area W2 is information (e.g., "WALK" text shown in FIG. 2) meaning that it is okay to cross to a person walking outside the vehicle, and the external display information may be in an icon form, a text form, or a combination form thereof.

In addition, it is possible to provide a guide message "it is okay to cross" through a voice signal in addition to the display through the external screen area W2.

Figure 3:
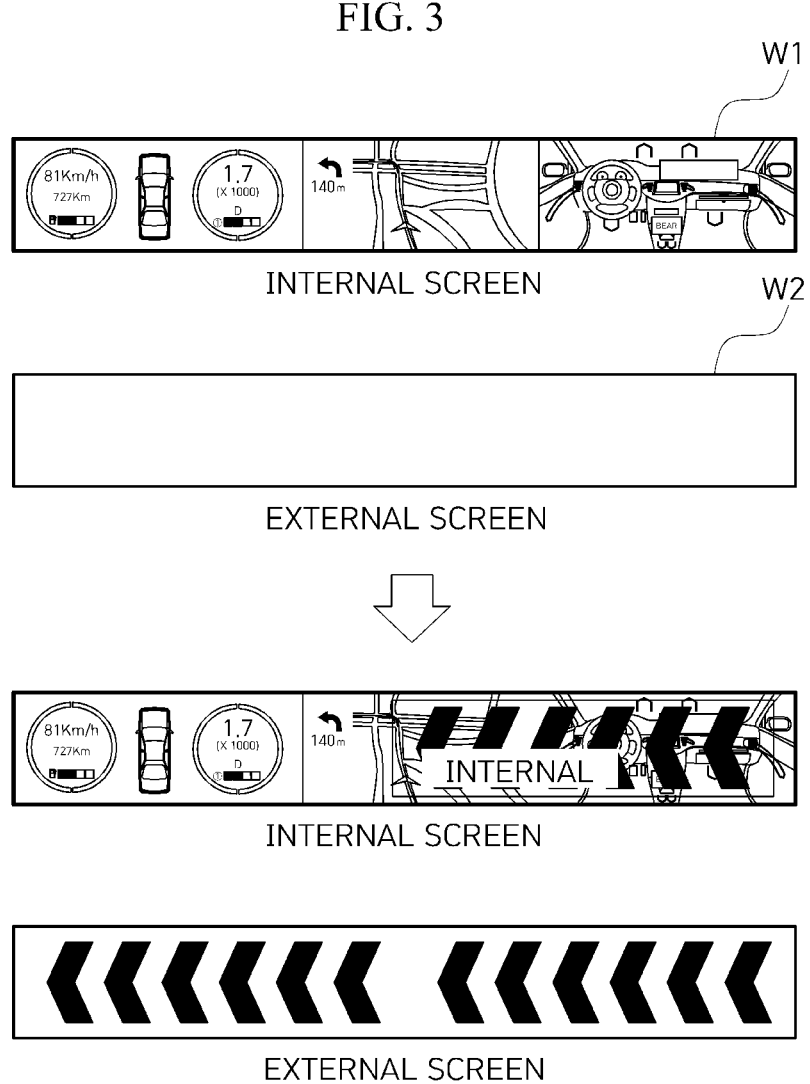
FIG. 3 illustrates icon/image displays in the internal screen area and the external screen area according to an exemplary embodiment of the present invention.

FIG. 3 illustrates icon/image displays in the internal screen area and the external screen area according to an exemplary embodiment of the present invention.

The internal screen area W1 is composed of a cluster area, an application area (navigation application, etc.), and a vehicle function area (air conditioner information, etc.).

Normally, driving-related information is projected on the internal screen area W1, and a separate projection is not carried out on the external screen area W2.

When the vehicle turns left, an icon (<<<<) for a vehicle traveling direction is projected on the internal screen area W1 and the external screen area W2, and the same image is displayed in a part of the external screen area W2 and the internal screen area W1.

The pedestrian may recognize a driving direction of the corresponding driving vehicle, and may avoid a collision through the image displayed through the external screen area W2.

Figure 4:
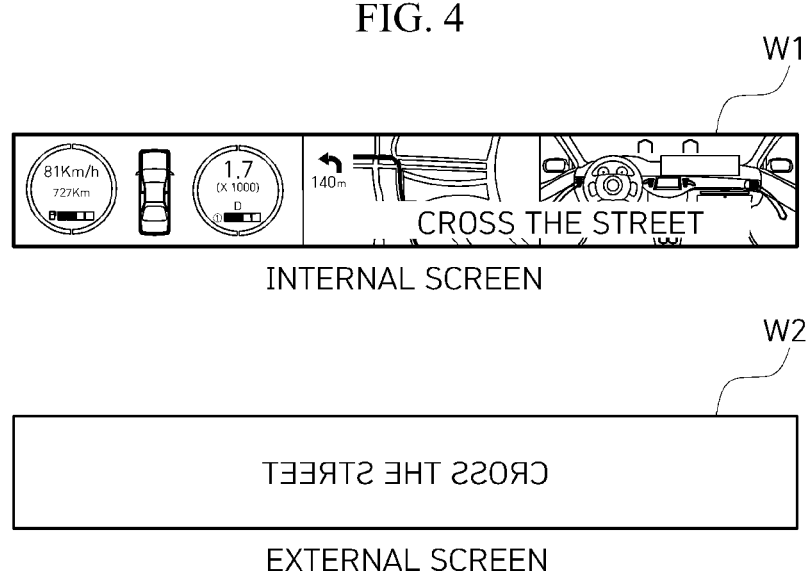
FIG. 4 illustrates text displays for the internal screen area and the external screen area according to an exemplary embodiment of the present invention.

FIG. 4 illustrates text displays for the internal screen area and the external screen area according to an exemplary embodiment of the present invention.

It is assumed that a driving vehicle is stopped at a crosswalk without a traffic light.

When it is determined that there is a pedestrian waiting to cross according to surrounding information obtained by the vehicle, the vehicle transmits a message including an indication that it is okay to cross.

At this time, when the vehicle is autonomously driven, it is automatically performed based on pedestrian recognition, and when the driver is performing manual driving, a command to display (project) a guidance phrase "CROSS THE STREET" is executed in response to a button input, a voice input, a gesture input, and the like.

The text "CROSS THE STREET" is displayed on a part of the internal screen area W1, and text in which the corresponding text is inverted right to left is displayed (projected) on the external screen area W2.

Through this, pedestrians outside the vehicle check the text phrase "CROSS THE STREET", recognize that the corresponding vehicle will remain stopped, and cross a crosswalk At this time, the vehicle may display, on a rear surface thereof, text indicating that the pedestrians are in a walking situation to inform other vehicles waiting behind thereof that the pedestrians in front thereof are in a crossing situation.

Figure 5:
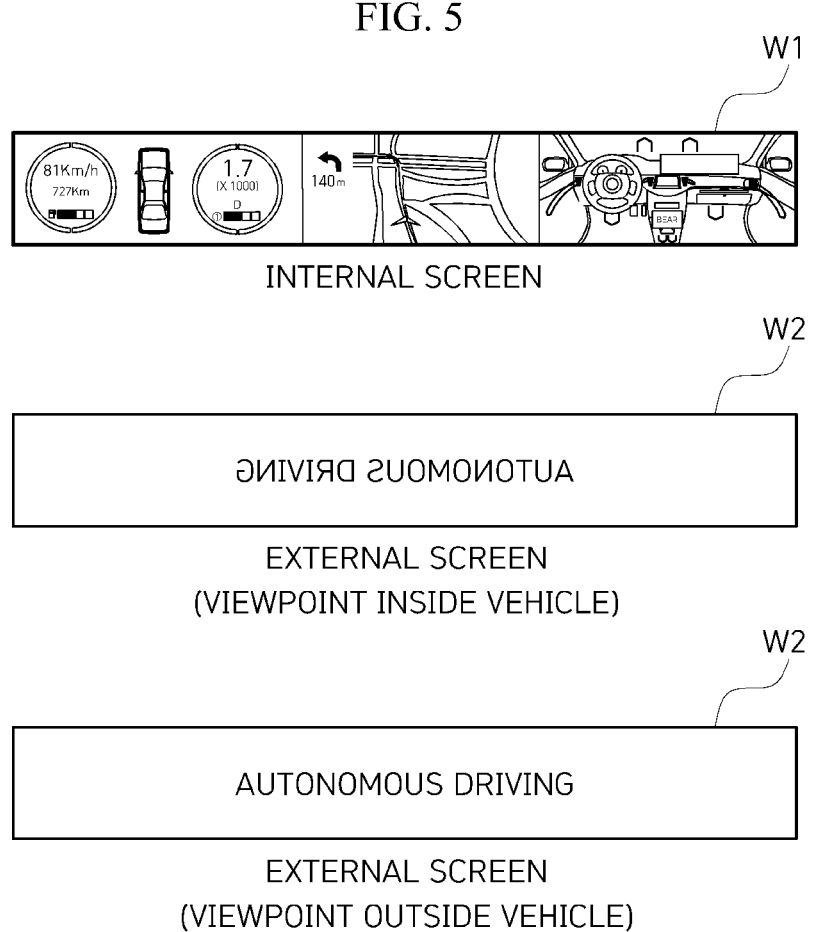
FIG. 5 illustrates display information of the internal screen area and the external screen area at the time of caution level 1 (normal driving) according to an exemplary embodiment of the present invention.

FIG. 5 illustrates display information of the internal screen area and the external screen area at the time of caution level 1 (normal driving) according to an exemplary embodiment of the present invention.

According to an exemplary embodiment of the present invention, information displayed on the internal screen area W1 and the external screen area W2 is selected and displayed according to a caution level.

In order to help those skilled in the art, an exemplary embodiment for a display according to caution level 1 (normal driving), caution level 2 (deceleration, low speed driving), caution level 3 (stop, low speed, external pedestrian approach), and caution level 4 (very close to a pedestrian) will be described below.

Referring to FIG. 5, the caution level during normal driving such as high-speed driving is relatively low (level 1), and thus cluster information, navigation information, and vehicle function information (e.g., air conditioner function information) are displayed on the internal screen area W1.

Separate projection is not performed on the external screen area W2, or vehicle driving information (during autonomous driving) is displayed as shown in FIG. 5.

FIG. 5 illustrates display statuses of the external screen area from the viewpoint of inside the vehicle and the external screen area from the viewpoint of outside the vehicle.

FIG. 6 illustrates display information of the internal screen area and the external screen area at the time of caution level 2 (deceleration, low-speed driving) according to an exemplary embodiment of the present invention.

According to driving environment recognition, when it is recognized that a road currently being driven on is a slow-moving section or a case of entering a narrow road, the caution level is increased to 2.

The driving environment recognition may be performed through various methods such as V2X, UWB, a camera, a lidar, and the like.

External image information acquired through the camera is displayed on the internal screen area W1 to display information on external pedestrians and obstacles.

In addition, a warning message (approach caution) about the approach of an external pedestrian and an obstacle is displayed on the internal screen area W1. In this case, the warning message for the external approach may include an approach direction, an approach speed, a separation distance, and the like.

In the external screen area W2, the vehicle driving information is displayed, and for example, information about being autonomously driven is displayed.

A driving speed and route information (straight, left, and right turns) of the current driving vehicle are displayed in the external screen area W2 so that an external pedestrian or a driver of another external vehicle may intuitively recognize behavior information of the driving vehicle.

Figure 7:
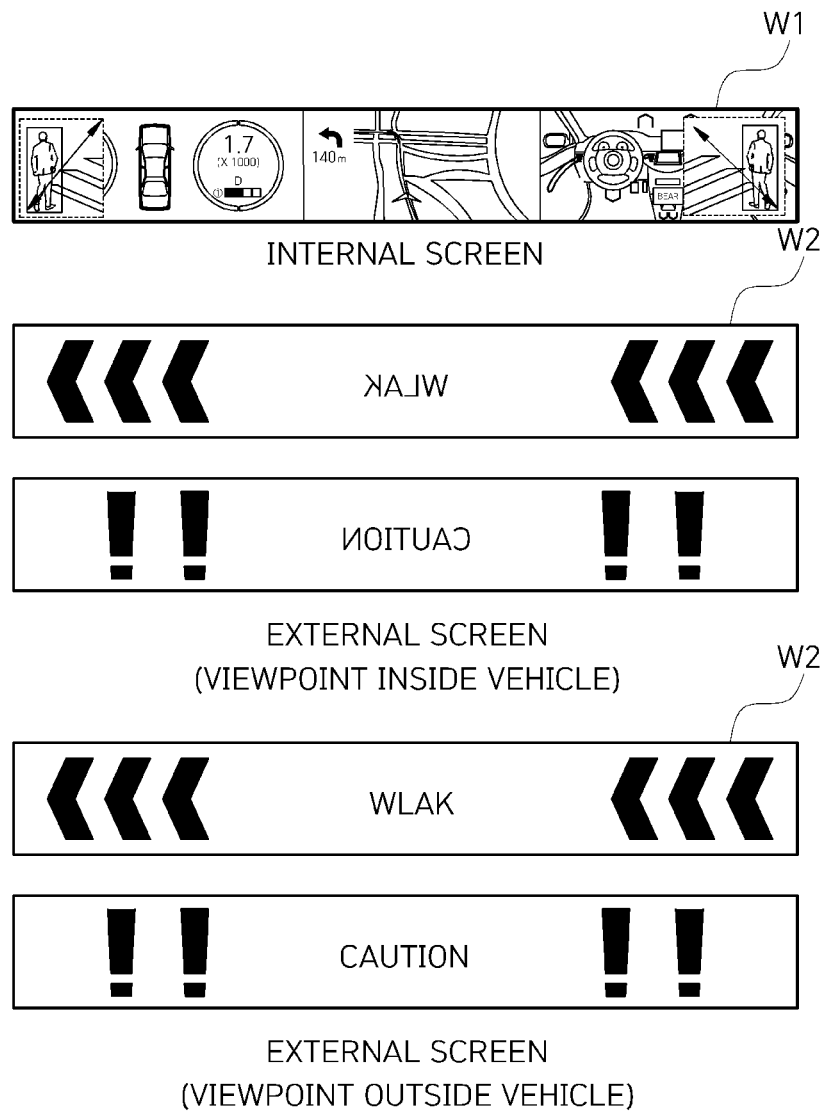
FIG. 7 illustrates display information of the internal screen area and the external screen area at the time of caution level 3 (stop, low speed, external pedestrian approach) according to an exemplary embodiment of the present invention.

FIG. 7 illustrates display information of the internal screen area and the external screen area at the time of caution level 3 (stop, low speed, external pedestrian approach) according to an exemplary embodiment of the present invention.

The caution level is raised by recognizing that it is a section with a high probability of collision, such as when approaching a crosswalk or when ambient noise is above a preset decibel.

Accordingly, the screen area for displaying external information is changed to be relatively larger in the internal screen area W1.

In addition, when the electrochromic film is made opaque for projection on the internal screen area W1, since it is difficult to check the external object projected by the corresponding opaque area, and it is controlled so that the internal screen area matched to the area where a pedestrian or obstacle is located based on the driver's gaze information becomes transparent.

The external screen area W2 displays a "WALK" message according to driving environment information, for example, when there is a pedestrian waiting to cross at a crosswalk, and provides a guide message for the pedestrian to cross.

In addition, in a section such as an alley where pedestrians and vehicles travel together, a "Caution" message is displayed to help nearby pedestrians recognize the presence of the corresponding vehicle.

Figure 8:
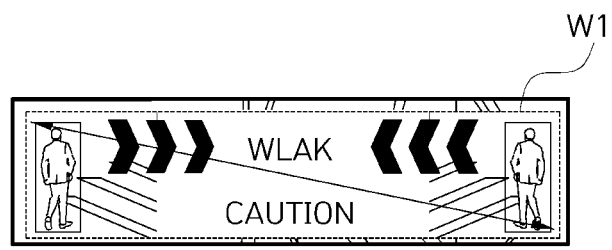
FIG. 8 illustrates display information of the internal screen area at the time of caution level 4 (very close to a pedestrian) according to an exemplary embodiment of the present invention.

FIG. 8 illustrates display information of the internal screen area at the time of caution level 4 (very close to a pedestrian) according to an exemplary embodiment of the present invention.

When the pedestrian approaches within a preset distance and it is determined that the possibility of collision is high, the caution level is raised.

In this case, the internal screen area W1 may be extended to a preset area.

Alternatively, the pedestrian image may be displayed as a whole in the internal screen area W1, and a warning phrase may be overlaid and displayed.

Through this, the driver may intuitively recognize the location and behavior of external pedestrians and obstacles, and may recognize that there is a high possibility of collision.

In addition, at the same time, by delivering voice warning information, a warning message is provided to the driver, and a horn or voice message is delivered to an outside pedestrian to avoid a collision.

Figure 9:
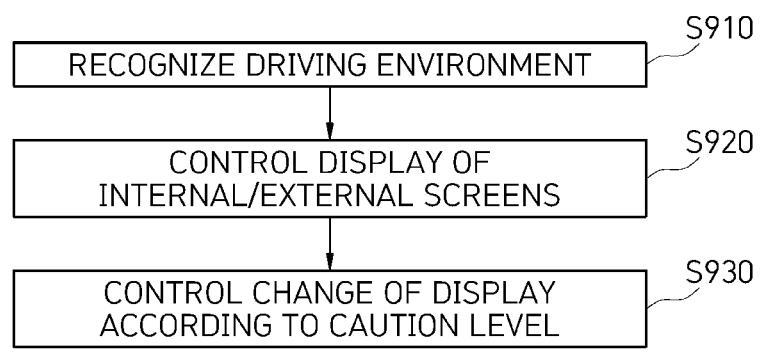
FIG. 9 illustrates a method of displaying display information according to the driving environment according to an exemplary embodiment of the present invention.

FIG. 9 illustrates a method of displaying display information according to the driving environment according to an exemplary embodiment of the present invention.

The method of displaying display information according to a driving environment according to the present invention includes operations of recognizing the driving environment (S910), controlling display of internal/external screens of a vehicle based on a recognition result of the driving environment (S920), and controlling display of the internal/external screens of the vehicle according to a change of a caution level (S930).

In operation S910, the caution level is calculated using a driving speed, map data, and external object recognition information.

In operation S920, information to be displayed in an internal screen area and an external screen area is extracted according to the caution level, and control is performed so as to display driving status information in the internal screen area and display a notification message in the external screen area.

In operation S920, a text message displayed in the external screen area is inverted right to left and the text message is displayed in a part of the internal screen area.

In operation S920, an image of vehicle traveling direction information is equally displayed in the internal screen area and the external screen area.

In operation S920, an external object image is displayed in the internal screen area, and at least one of approach direction information, approach speed information, and distance information of the external object is displayed in the internal screen area.

In operation S930, an area of the external object image displayed in the internal screen area is expanded, and a guidance message for the external object is displayed in the external screen area as the caution level is increased.

In operation S930, the external object image is displayed over the entire internal screen area, and a warning phrase is overlaid and displayed as the caution level is further increased.

Hereinafter, an apparatus and method for displaying information of a vehicle according to another exemplary embodiment of the present invention will be described.

A driver or passenger in the vehicle may check various pieces of information related to vehicle driving through display devices such as a head-up display (HUD), a center stack display, and an instrument cluster.

As such, the display devices such as the HUD, the center stack display, and the instrument cluster (hereinafter referred to as "internal display device") are mainly used for the purpose of providing information (hereinafter referred to as "internal display information") to the driver or the passenger in the vehicle.

Recently, a display device (hereinafter, referred to as "external display device") used for the purpose of providing various pieces of information (hereinafter, referred to as "external display information") to pedestrians outside the vehicle has been installed in the vehicle.

The external display apparatus is configured to include an electrochromic film (polymer dispersed liquid crystal: PDLC film) attached to the front windshield and window of the vehicle, and a projector that provides various pieces of information to pedestrians outside the vehicle by projecting a light source on the electrochromic film.

The electrochromic film may be used as a large-screen display area by making the windshield and window opaque in an autonomous driving situation, and the windshield and window are made transparent in a manual driving situation to secure external visibility and enable driving.

The external display apparatus is widely used mainly for advertisement, and may also be used for the purpose of display related to vehicle driving.

For example, when a vehicle stops after checking a pedestrian crossing a road without a traffic light, if external display information indicating the road crossing of himself/herself (pedestrian) is displayed in a text form (e.g., displaying "CROSS THE STREET") or in a graphic form (e.g., indicating pedestrian movement with "arrows", etc.) through an external display apparatus installed in the vehicle, the pedestrian will gain psychological relief that the vehicle will not approach while crossing the road.

Meanwhile, such external display information needs to be checked by a driver or a passenger in the vehicle, but the fact is that the interest in this is still insufficient.

According to another exemplary embodiment of the present invention, the driver or the passenger inside the vehicle may easily determine the readability of the external display information and the driving and stopping timing of the vehicle by checking the external display information displayed on the external display apparatus inside the vehicle.

Figure 10:
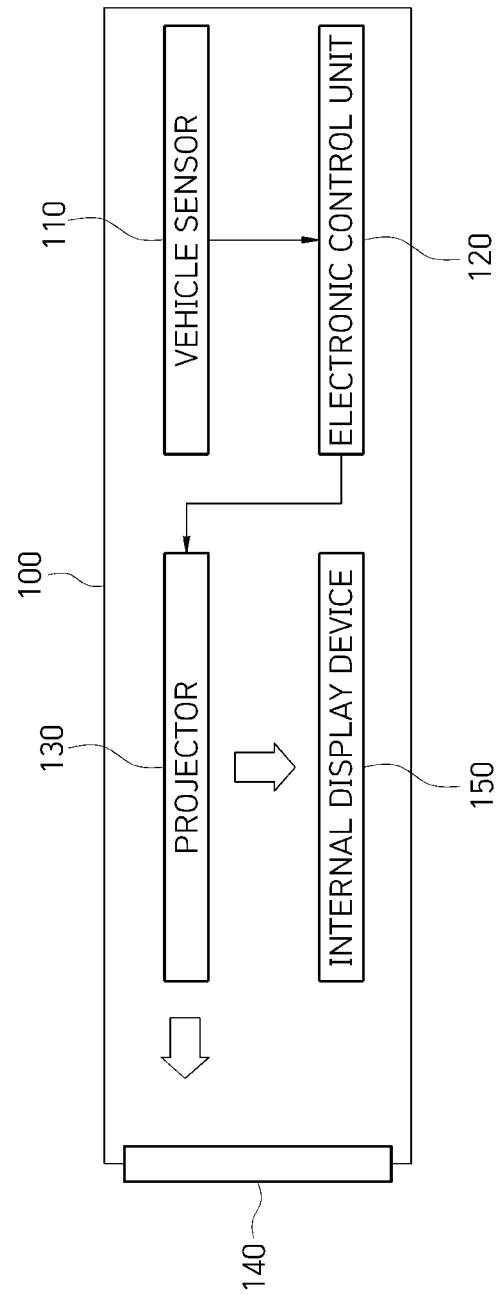
FIG. 10 is a block diagram of an apparatus for displaying information of a vehicle according to another exemplary embodiment of the present invention.
Figure 11:
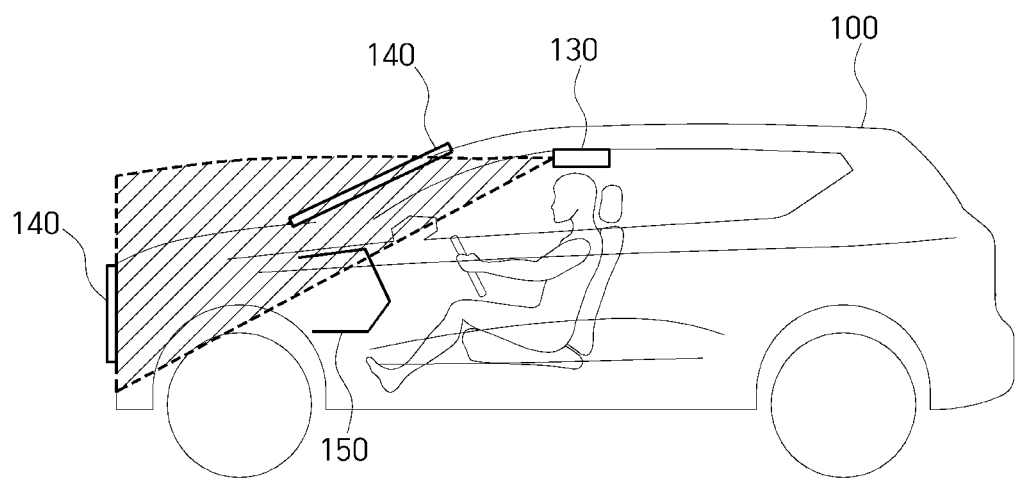
FIG. 11 is a view showing positions in which a projector and a screen shown in FIG. 10 are mounted in the vehicle.

FIG. 10 is a block diagram of an apparatus for displaying information of a vehicle according to another exemplary embodiment of the present invention, and FIG. 11 is a view showing positions in which a projector and a screen shown in FIG. 10 are mounted in the vehicle.

Referring to FIG. 10, the information display apparatus of a vehicle 100 according to another exemplary embodiment of the present invention includes a projector 130, a screen 140 on which a beam of the projector 130 is projected, and an internal display device 150 on which the beam of the projector 130 is selectively or simultaneously projected.

The projector 130 is installed inside the vehicle 100, and for example, as shown in FIG. 11, may be installed on an inner roof side of the vehicle 100.

The vehicle 100 may be an electric vehicle using electrical energy as a power source, a general vehicle using an engine driving as a power source, a vehicle having an autonomous driving function, or a combination thereof.

The projector 130 projects a projector beam including external display information on the screen 140, and although not particularly limited, may be, for example, a short-throw projector capable of projecting a large screen even when a distance to the screen 140 is short.

The external display information displayed by the beam projected on the screen 140 may be information for a pedestrian moving outside the vehicle 100, for example, may be information related to the movement of the pedestrian (e.g., information related to the pedestrian's crossing).

Such external display information may be in a form of an icon, text, or a combination thereof.

As shown in FIG. 11, the screen 140 is installed on the front side of the vehicle and/or the front window glass of the vehicle, and the beam (screen, image or light source) from the projector 130 is projected.

Although FIG. 11 illustrates the screen 140 installed on the front of the vehicle and the front window glass of the vehicle, the screen 140 may be installed on both sides of the vehicle, the rear of the vehicle, and the side and rear window glass of the vehicle. In this case, the projector 130 may be installed on the inner roof of the vehicle 100 so as to be rotatable to adjust a direction of the emitted beam.

As an example of the screen 140, an electrochromic film (polymer dispersed liquid crystal: PDLC film) may be exemplified.

In case of the electrochromic film, when the projector 130 is turned on, the electrochromic film is converted to an opaque state, and may be used for screen expression and display by the projector 130. In this case, the screen is visible only from the outside, and the screen shown outside is not visible from the inside of the vehicle.

The electrochromic film may be used as a display by being applied (attached) to some or all areas of the window glass. When the electrochromic film is applied to the window glass, the screen seen according to a tilt degree of the window glass may also be tilted, but it enables the screen to be normally seen through image warping.

In this specification, the screen, an electrochromic film, and the like may be replaced with the term "external display screen".

The internal display device 150 serves as a screen on which the beam of the projector 130 is projected so that a driver or a passenger inside the vehicle may check the external display information projected on the screen 140. In this specification, the internal display device may be replaced with the term "internal display screen".

As an example of the internal display device 150, it may be a display screen of a center stack display, an instrument cluster, or an audio video navigation (AVM).

Since the internal display device 150 has a structure in which the outside of the vehicle cannot be seen, like the window glass of the vehicle, the internal display device 150 may sufficiently serve as a screen without applying the electrochromic film to the surface thereof.

Of course, an electrochromic film made of a translucent material that does not interfere with checking unique information (main information such as vehicle speed and fuel economy) displayed by the internal display device 150 may be attached to the surface of the internal display device 150 to maximize the effect of the screen.

Information projected on the surface of the internal display device 150 (hereinafter, internal display information) is configured with the same information as external display information so that a driver or a passenger may check the external display information.

However, when the external display information projected from the projector 130 on the screen is text, and the external display information projected from the same projector 130 is projected on the surface of the internal display device 150 as it is to utilize the internal display information, since the text is inverted right to left, there is a problem that the readability of the internal display information in the form of text is deteriorated from the driver's point of view.

This problem will be described in detail with reference to FIGS. 12A-12C.

Figure 12A:
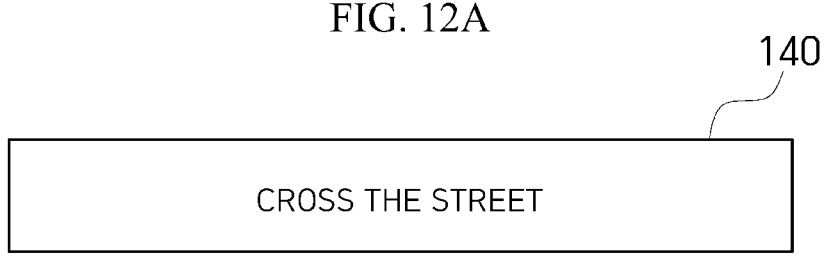
FIGS. 12A-12C is a view for describing a problem that occurs when projecting external display information in a text format displayed by the same projector on an internal display apparatus.
Figure 12B:
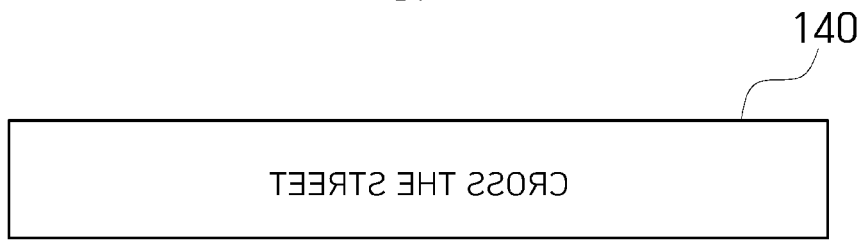

First, when the external display information projected on the screen 140 by the projector 130 is text information such as "CROSS THE STREET", the text information displayed on the screen 140 is seen as normal as shown in FIG. 12A from the viewpoint of a pedestrian located outside the vehicle, but since the viewpoint of a driver looking at the screen 140 is located behind the screen 140, the text information displayed on the screen 140 from the driver's viewpoint will be seen as an abnormal arrangement of being inverted right to left as shown in FIG. 12B. Here, FIG. 12B is not actually visible to the driver, but assumes a situation in which the text information displayed on the screen 140 is viewed from the driver's viewpoint.

Figure 12C:

Therefore, when the image output from the same projector 130 is projected on the internal display device 150 without any manipulation and displayed as internal display information for checking external display information, as shown in FIG. 12C, it will be displayed as text information in an abnormal arrangement of being inverted right to left.

Thus, the internal display information projected on the internal display device 150 acts as a factor deteriorating the driver's readability.

In order to solve this problem, in the present invention, when the external display information displayed on the screen 140 is text information, a screen switching function of the projector 130 is configured to control so that the inverted left to right text information is projected on the surface of the internal display device 150.

A method of displaying internal display information corresponding to external display information using one projector will be described in detail below.

Referring again to FIG. 10, a vehicle sensor 110 and an electronic control unit (ECU) 120 that interwork with the operation of the projector 130 are further included.

The vehicle sensor 110, the electronic control unit 120, the projector 130, and the internal display device 150 may perform data communication with each other using an in-vehicle communication network (CAN or LIN).

The vehicle sensor 110 senses a movement of a pedestrian or a vehicle, and may be composed of a radar, a lidar, an ultrasonic sensor, a camera, or a combination thereof.

In the case of the camera, the movement of a pedestrian may be sensed by processing a video image including the pedestrian based on various image processing algorithms. As an example of the image processing algorithm, all known algorithms capable of calculating the motion of an object, such as an object extraction algorithm and a background removal algorithm, are included, and a description thereof will be omitted.

The electronic control unit 120 controls and manages operations of the vehicle sensor 110, the projector 130, and the internal display device 150.

In addition, when sensing data representing the pedestrian movement in front of the vehicle is input from the vehicle sensor 110, the electronic control unit 120 instructs the projector 130 to start operation in response to the sensing data.

The projector 130 starts operation in response to an operation start command from the electronic control unit 120. That is, the projector 130 is turned on, and at the same time, the electrochromic film constituting the screen 140 is converted to an opaque state, and it is converted to a ready state for use as a screen expression and display by the projector 130.

In addition, the operation of the projector 130 may be started by a brake pedal input value input from a brake control unit. In this case, the electronic control unit 120 may be a brake control unit or an integrated electronic control unit in communication with the brake control unit.

Hereinafter, a method of checking (displaying) the external display information displayed outside the vehicle based on the projector 130 inside the vehicle will be described in detail.

Figure 13:
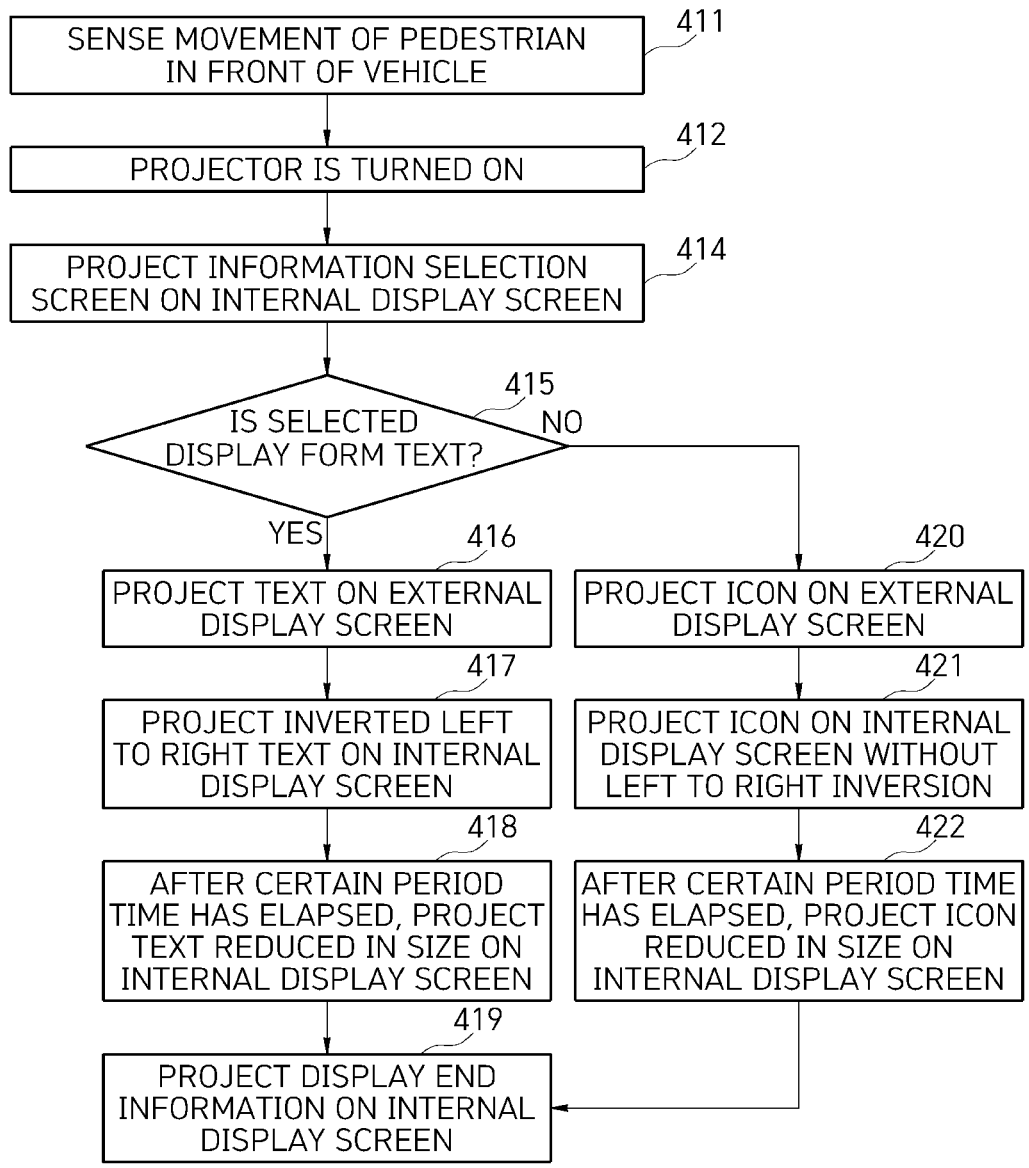
FIG. 13 is a flowchart for describing a method of displaying external display information displayed on the outside of the vehicle inside the vehicle according to another exemplary embodiment of the present invention.
Figure 14:
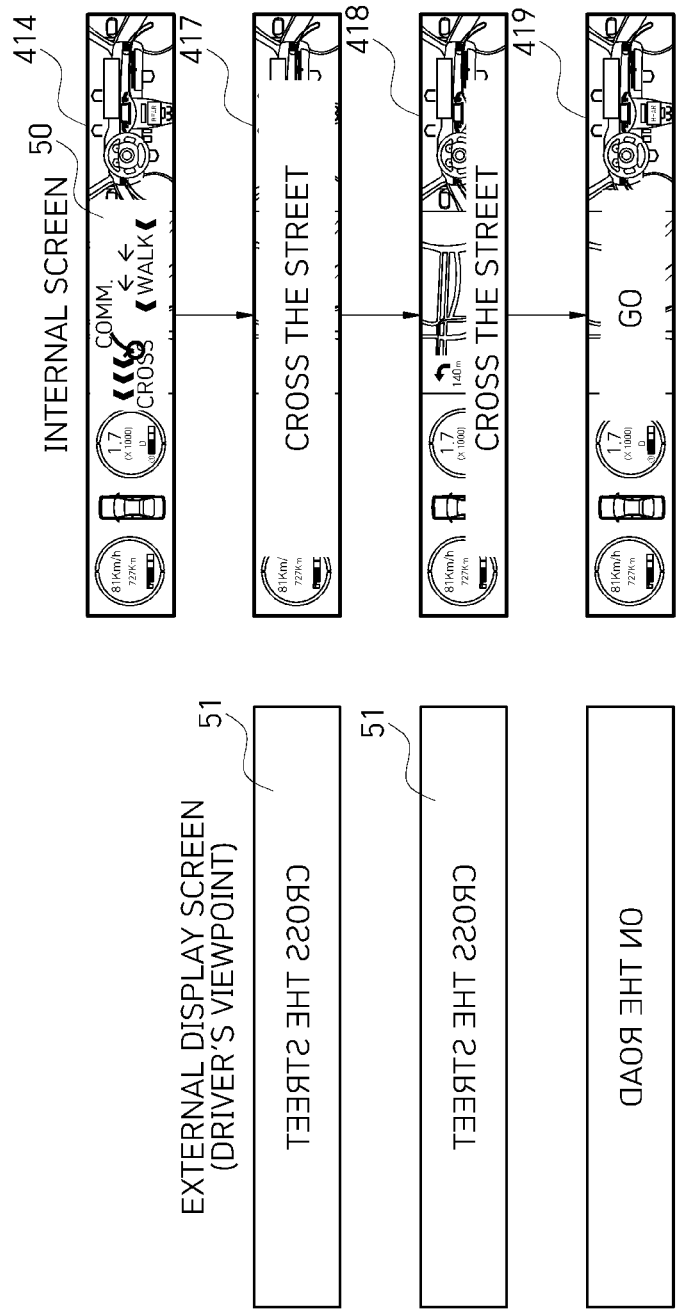
FIGS. 14 and 15 are views schematically showing some operations of the flowchart shown in FIG. 13 for easier understanding.
Figure 15:
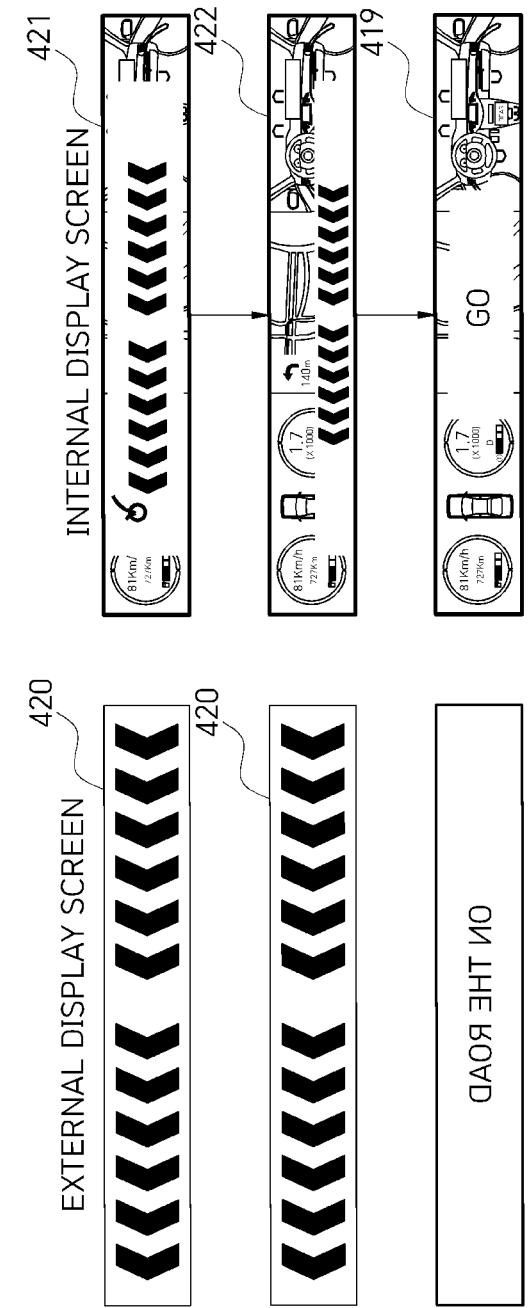

FIG. 13 is a flowchart for describing a method of displaying external display information displayed on the outside of a vehicle inside the vehicle according to another exemplary embodiment of the present invention, and FIGS. 14 and 15 are views schematically showing some operations of the flowchart shown in FIG. 13 for easier understanding.

First, referring to FIG. 13, in operation 411, a process of sensing a movement of a pedestrian in front of a vehicle by the vehicle sensor 110 is performed. The vehicle sensor 110 includes a radar, a lidar, an ultrasonic sensor, a camera, and the like, and it is possible to calculate a pedestrian's moving distance and a pedestrian's moving direction as well as a road width by fusing the sensing data measured thereby.

Based on the fusion result of the measured data, it is possible to check whether the pedestrian is crossing the road or has arrived at the opposite sidewalk. Since the fusion technology of such sensing data is known, a description thereof is replaced with a known technique.

Then, in operation 412, when a movement of the pedestrian in front of the vehicle is sensed by the vehicle sensor 110, the projector 130 is turned on according to an operation start command of the electronic control unit 120. The projector 130 is turned on, and simultaneously, the external display screen (screen 140: electrochromic film) for displaying external display information is switched from a transparent state to an opaque state to start functioning as a screen for displaying the external display information.

Next, in operation 414, when the projector 130 is turned on, the projector 130 projects and displays an information selection screen on the internal display screen 150. Here, the internal display screen 150 may be a surface of the internal display device 150 having a display function such as an instrument panel, a center stack display, or an AVN, which is installed in the vehicle.

As shown in FIG. 5, the information selection screen 50 projected on the internal display screen 150 may be a kind of user interface screen for selecting a type of internal display information corresponding to the external display information for a user (a driver or a passenger) to check the external display information displayed outside the vehicle.

FIG. 14 illustrates an instrument panel displaying vehicle driving information such as vehicle speed and fuel economy as the internal display screen 150 on which the information selection screen 50 is projected.

The type of internal display information provided to the information selection screen 50 projected on the internal display screen 150 includes a text item, an icon item, and a combination thereof.

When a user (a driver or a passenger) selects a text item, internal display information corresponding to external display information is displayed in a text form on the internal display screen 150, and when the user selects an icon item, the internal display information corresponding to the external display information is displayed in a form of an icon on the internal display screen 150.

Referring again to FIG. 13, in operation 415, a process of determining whether a display form of the internal display information selected by the user is text is performed.

When the user selects the text as the display form of the internal display information, the projector 130 projects and displays the text on the external display screen 140 (screen or electrochromic film) in operation 416.

Next, in operation 417, the projector 130 inverts the text projected on the external display screen 140 left to right and projects and displays the text on the internal display screen 150.

When the text projected on the external display screen 140 is "CROSS THE STREET", as shown in FIG. 14, it may be seen as reversed text 51 from the driver's viewpoint.

Therefore, when the text "CROSS THE STREET" projected on the external display screen 140 is projected on the internal display screen 150 as it is, the driver recognizes the reversed text 51, and thus the readability of the text is deteriorated.

Accordingly, in the present invention, in operation 417, the projector 130 projects inverted left to right text on the internal display screen 150 by performing a screen switching process.

At this time, when applying (or attaching) the electrochromic film to the internal display screen 150, an electrochromic film made of a semi-transparent material may also be used so that main information (vehicle driving information, etc.) such as speed and fuel economy displayed on the rear screen is not covered by the electrochromic film.

Alternatively, in operation 418, as shown in FIG. 14, after a certain period of time has elapsed (e.g., three seconds), the size of the inverted left to right text may be reduced to project on the internal display screen 150. Thus, it is possible not to cover the main information such as speed and fuel economy (vehicle driving information, etc.) by reducing the size of the inverted left to right text.

Then, when the vehicle sensor 110 senses that the pedestrian has reached the opposite sidewalk, the projector 130 projects the text indicating that the pedestrian has reached the opposite sidewalk on the external display screen 140 according to the control of the electronic control unit 120.

The text indicating that the pedestrian has reached the opposite sidewalk may be, for example, "ON THE ROAD", as shown in FIG. 14.

Alternatively, in operation 419, the projector 130 projects the text indicating a display end time point (display end information) on the internal display screen 150 unlike the text (e.g., "ON THE ROAD") projected on the external display screen 140. The text indicating the display end time point (display end information) may be, for example, "GO".

From the driver's point of view, it is more desirable that the driver recognizes the time when the vehicle is driving or stopped by checking the text that may check the display end as the internal display information, rather than checking the external display information indicating that the pedestrian has reached the opposite road (completion of the pedestrian's movement) from the inside.

Returning to operation 415, when the display form of the internal display information selected by the user is not text but an icon in operation 415, the projector 130 projects the external display information consisting of icons on the external display screen 140 in operation 420. Here, the icon may be an arrow indicating the movement direction of the pedestrian as shown in FIG. 6.

Then, in operation 421, the projector 130 projects an icon of the same shape as the icon projected on the external display screen 140 on the internal display screen 150. At this time, unlike the text, the icon does not need to be inverted left to right.

Next, in operation 422, after a certain period of time has elapsed (e.g., three seconds), for the same purpose of performing operation 418 described above, the projector 130 projects an icon reduced in size on the internal display screen 150 so that the main information (vehicle driving information, etc.) such as speed and fuel economy displayed on the rear screen is not covered.

Then, a process proceeds to the above-described operation 419, and the projector 130 projects the display end information on the internal display screen 150.

Figure 16:
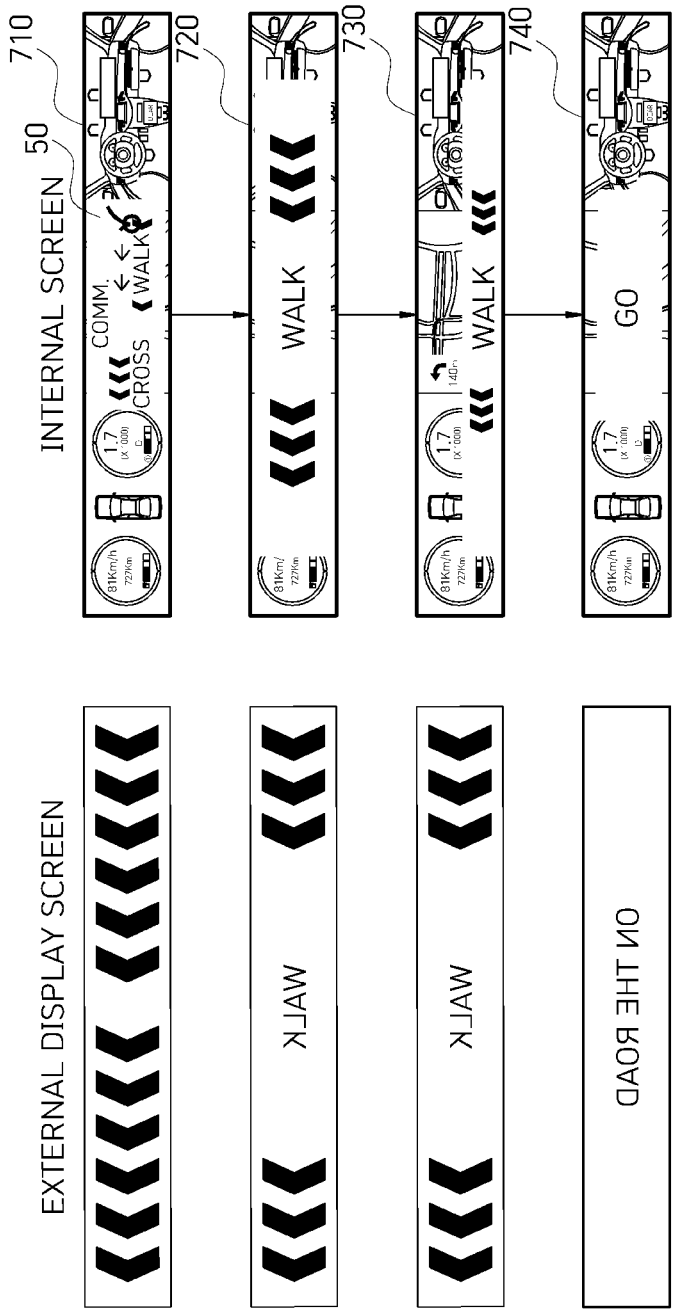
FIG. 16 is a view for schematically describing a method of displaying external display information displayed on the outside of a vehicle inside the vehicle according to still another exemplary embodiment of the present invention.

FIG. 16 is a view for schematically describing a method of displaying external display information displayed on the outside of a vehicle inside the vehicle according to still another exemplary embodiment of the present invention.

Referring to FIG. 16, still another exemplary embodiment of the present invention is different from the aforementioned exemplary embodiment in that external display information in which an icon and text are mixed is checked inside the vehicle.

In a display method according to still another exemplary embodiment of the present invention, operations 411, 412, and 414 of the above-described display method are performed in the same manner.

In operation 710, when the user selects an internal display item including an icon and text on the information selection screen projected on the internal display screen 150, the projector 130 projects the internal display information, which is a composite of the icon and the text that is inverted left to right, on the internal display screen 150 in operation 720. The icon may be, for example, an arrow indicating a movement direction of the pedestrian, and the text may be, for example, "Walk".

Next, in operation 730, after a certain period of time has elapsed (e.g., three seconds), the projector 130 projects internal display information having a reduced size on the internal display screen 150.

Next, in operation 740, when the vehicle sensor 110 senses that the pedestrian has arrived at the opposite sidewalk, the projector 130 projects text (e.g., "GO") indicating a display end time (or text indicating the start of vehicle driving) unlike text (or text indicating completion of crossing of pedestrian) displayed on the external display screen 140 on the internal display screen 150 according to the control of the electronic control unit 120.

Figure 17:
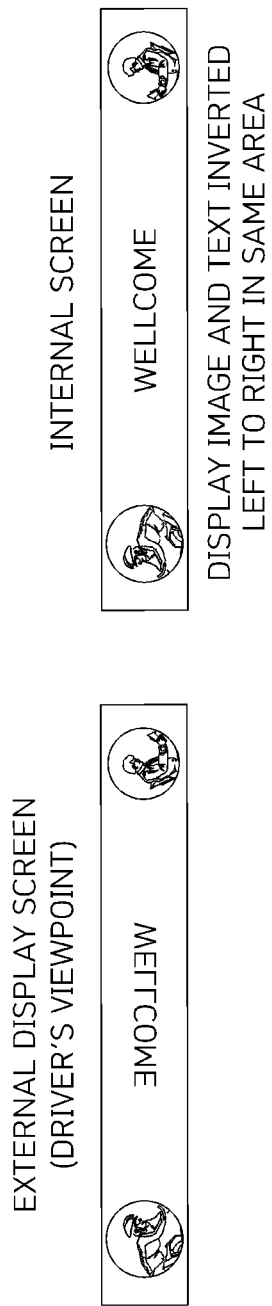
FIG. 17 is a view for describing a method of displaying information according to yet another exemplary embodiment of the present invention.

FIG. 17 is a view for describing a method of displaying information according to yet another exemplary embodiment of the present invention.

Referring to FIG. 17, the method of displaying internal information according to yet another exemplary embodiment of the present invention relates to a method of displaying internal information when a vehicle approaches, and when a vehicle driven by an acquaintance of a driver is recognized by the vehicle sensor 110 (e.g., the vehicle sensor 110 recognizes a license plate), external display information including an image (or a facial image) of the driver, an image of the acquaintance (or a facial image of the acquaintance), and text indicating a welcome (e.g., greeting or welcome) between an area where the image of the driver is displayed and an area where the image of the acquaintance is displayed may be displayed on the external display screen 140.

The image or text of the external display information is inverted left to right in the same area, and is displayed as internal display information on the internal display screen 150, and thus the external display information may be checked by the driver.

Meanwhile, the method of displaying display information according to the driving environment according to the exemplary embodiment of the present invention may be implemented in a computer system or recorded in a recording medium. The computer system may include at least one processor, a memory, a user input device, a data communication bus, a user output device, and a storage. Each of components described above performs data communication through the data communication bus.

The computer system may further include a network interface coupled to a network. The processor may be a central processing unit (CPU) or a semiconductor device that processes instructions stored in the memory and/or the storage.

The memory and the storage may include various types of volatile or non-volatile storage media. For example, the memory may include a ROM and a RAM.

Therefore, the method of displaying display information according to the driving environment according to the exemplary embodiment of the present invention may be implemented as a method executable by the computer. When the method of displaying display information according to the driving environment according to the exemplary embodiment of the present invention is performed in the computer device, computer readable instructions may perform the method of displaying display information according to the present invention.

Meanwhile, the method of displaying display information according to the driving environment according to the present invention described above may be implemented as a computer-readable code on a computer-readable recording medium. The computer-readable recording medium includes all types of recording medium in which data that can be read by a computer system is stored. For example, there may be a read only memory (ROM), a random-access memory (RAM), a magnetic tape, a magnetic disk, a flash memory, an optical data storage device, and the like. In addition, the computer-readable recording medium may be distributed in computer systems connected through a computer communication network, and stored and executed as readable codes in a distributed manner.

According to the present invention, by controlling/managing display information provided to passengers inside a vehicle and the display information provided to the pedestrians outside the vehicle according to a driving environment, a driver easily recognizes the presence of pedestrians and obstacles so as to avoid a collision and external pedestrians intuitively recognize the driving behavior of the vehicle so as to avoid a collision, and accordingly, there is an effect of improving driving safety.

The effects of the present invention are not limited to the above-mentioned effects, and other effect not mentioned will be clearly understood by those skilled in the art from the above description.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A system for displaying display information according to a driving environment, the apparatus comprising:
one or more processors configured to:
receive driving environment information;

select respective information, and control a display of the selected respective information in an internal screen area and an external screen area according to preset partitioning, according to the driving environment information;

calculate a probability of collision using the driving environment information;

extract information to be displayed in the internal screen area and the external screen area in accordance with probability of collision;

control, in consideration of the probability of collision, a display of driving status information in the internal screen area and a notification message in the external screen area as the selected respective information, and control a display of a guidance message, for an external object, in the external screen area based on an increase in the probability of collision, wherein the control of the display of the driving status information includes a controlling of a size of the displayed driving status information to increase in accordance with the increase, or another increase, in the probability of collision.

2. The system of claim 1, wherein the one or more processors are configured to invert a text message and control a display of the inverted text message in the external screen area left to right, and control a display of the text message in a part of the internal screen area.

3. The system of claim 1, wherein the one of more processors are configured to control a respective display an image of vehicle traveling direction information in the internal screen area and the external screen area.

4. The system of claim 3, wherein the control of the display of the image of the vehicle traveling direction information includes an equal display of the image of the vehicle traveling direction information in the internal screen area and the external screen area.

5. The system of claim 1, wherein the one or more processors are further configured to:

control a display of the external object image over an entirety of the internal screen area; and control an overlaying of a warning phrase over the external object image in the internal screen area in accordance with the increase in the probability of collision.

6. The system of claim 1, further comprising a display that includes the internal screen area and the external screen area.

7. The system of claim 6, wherein the one or more processors and the display are configured as respective components of a vehicle, with the display comprising a vehicle-inward configured display that includes the internal screen area and a vehicle-outward configured display that includes the external screen area.

8. The system of claim 1, wherein the system is a system of a vehicle, which includes a windshield having one or more electrochromic films, with the one or more electrochromic films providing the internal screen area and the external screen area respectively disposed with respect to the windshield to display the selected respective information based on the control by the one or more processors of the display of the selected respective information.

9. The system of claim 8, further comprising a projector that is configured to generate the displayed selected respective information, through projection of respective projector beams to the internal screen area and the external screen area, based on the control by the one or more processors of the display of the selected respective information.

10. A method of displaying display information according to a driving environment, the method comprising:

recognizing driving environment information on an outside of a vehicle;

calculating a probability of collision using the driving environment information;

controlling display of internal and external screens of the vehicle based on a recognition result of the driving environment and the probability of a collision so as to display driving status information or the internal screen area and display a notification message in the external screen area; and increasing a size of the driving status information displayed on the internal screen of the vehicle according to an increase in the probability of collision.

11. The method of claim 10, wherein the probability of a collision is calculated using a driving speed, map data, and external object recognition information.

12. The method of claim 10, wherein the controlling display of the internal and external screens of a vehicle comprises inverting a text message displayed in the external screen area left to right and displaying the text message in a part of the internal screen area.

13. The method of claim 10, wherein the controlling display of the internal and external screens of a vehicle comprises equally displaying an image of vehicle traveling direction information in the internal screen area and the external screen area.

14. The method of claim 10, wherein the controlling display of the internal and external screens of a vehicle comprises displaying an external object image in the internal screen area, and displaying at least one of approach direction information, approach speed information, and distance information of an external object in the internal screen area.

15. The method of claim 14, wherein the controlling display of internal and external screens of a vehicle comprises expanding an area of the external object image displayed in the internal screen area, and displaying a guidance message for the external object in the external screen area as the probability of collision is increased.

16. The method of claim 15, wherein the controlling display of internal and external screens of a vehicle comprises displaying the external object image over the entire internal screen area, and overlaying and displaying a warning phrase as the probability of collision is further increased.

* * * * *